No. 675,941. Patented June 11, 1901.
P. E. ERICKSON.
PORTABLE DUMP AND ELEVATOR.
(Application filed Mar. 2, 1901.)
(No Model.) 2 Sheets—Sheet 2.
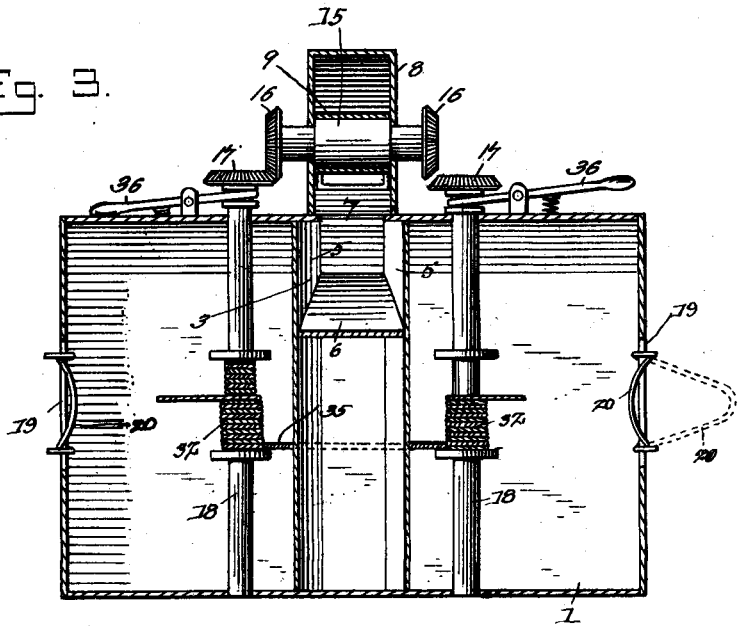
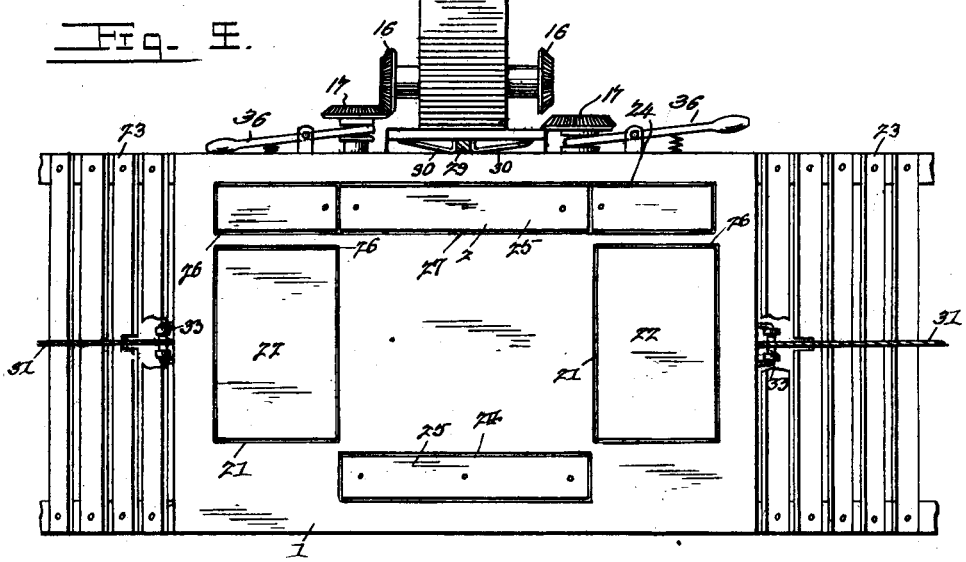

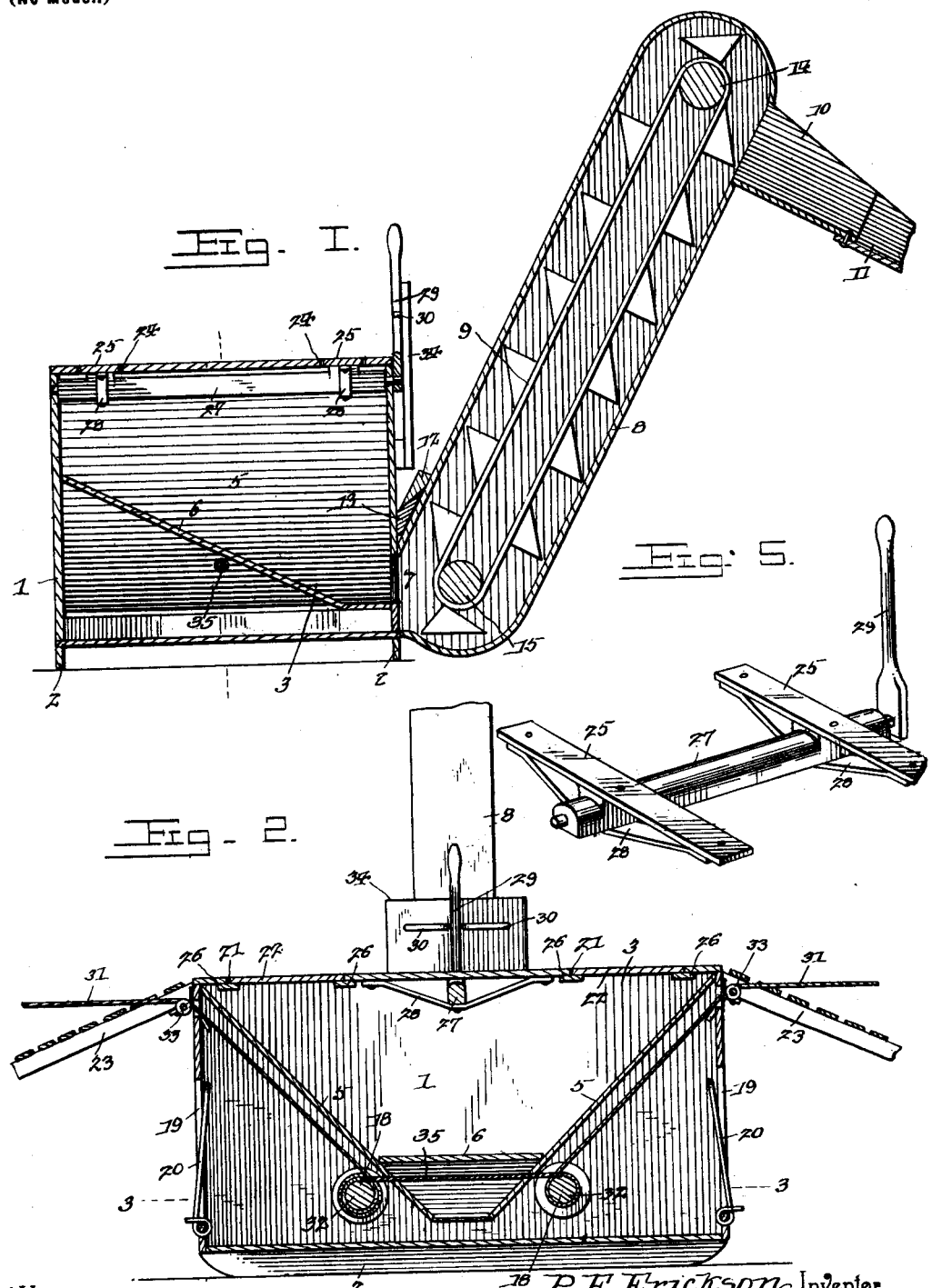

# UNITED STATES PATENT OFFICE.

PAUL E. ERICKSON, OF SCANDIA, KANSAS.

PORTABLE DUMP AND ELEVATOR.

SPECIFICATION forming part of Letters Patent No. 675,941, dated June 11, 1901.

Application filed March 2, 1901. Serial No. 49,624. (No model.)

*To all whom it may concern:*

Be it known that I, PAUL E. ERICKSON, a citizen of the United States, residing at Scandia, in the county of Republic and State of Kansas, have invented a new and useful Portable Dump and Elevator, of which the following is a specification.

The invention relates to improvements in portable dumps and elevators.

The object of the present invention is to provide a simple and comparatively inexpensive apparatus designed for elevating grain and the like and adapted to have a wagon driven on it and capable of dumping the same and of being operated by the empty wagon when leaving it, whereby the material is elevated and conveyed to a crib or other place for depositing the same.

The invention consists in the construction and novel combination and arrangement of parts, hereinafter fully described, illustrated in the accompanying drawings, and pointed out in the claims hereto appended.

In the drawings, Figure 1 is a vertical sectional view of a portable dump and elevator constructed in accordance with this invention, the section being taken transversely of the hopper or pit. Fig. 2 is a vertical sectional view taken at right angles to Fig. 2. Fig. 3 is a horizontal sectional view on the line 3 3 of Fig. 2. Fig. 4 is a plan view. Fig. 5 is a detail view of the dumping device.

Like numerals of reference designate corresponding parts in all the figures of the drawings.

1 designates an oblong frame or casing mounted on runners 2 and provided with a tapering hopper or pit 3, formed by inclined walls 5 and 6 and one of the sides of the casing and extending downward to an opening 7, at which point is arranged an inclined conveyer 8. The inclined conveyer 8, which is provided with an interior endless carrier 9, is detachably secured to the casing 1 and is adapted to elevate the grain to an inclined chute 10. The chute 10 extends downward from the top of the conveyer, and it is provided with a pivoted lower section 11, adapted to be swung rapidly and capable of being readily arranged for directing the material into a crib or other receptacle for the grain or other material.

The conveyer is provided near its lower end with a horizontal bar 12, extending laterally from the conveyer at the upper side of the same and having a beveled projecting longitudinal edge which interlocks with a similar beveled edge of a bar or cleat 13, secured to the casing 1 and located directly above the opening 7 and adapted to support the endless conveyer. By this construction the endless conveyer may be readily mounted on and removed from the casing 1.

The endless carrier is mounted on upper and lower shafts 14 and 15, and the lower shaft 15, which is extended through the side walls of the conveyer, is provided with exterior gear-wheels 16, keyed or otherwise secured to the said shaft 15 and meshing with gear-wheels 17 of transverse shafts 18. The transverse shafts 18, which are located at opposite sides of the lower portion of the tapering hopper, are journaled in suitable bearings of the casing 1, and the gear-wheels 17 are keyed or otherwise secured to them. The gearing is preferably provided with bevel spur-teeth; but any other form of gearing may be employed, and the said transverse shafts 18 are adapted to be rotated by the means hereinafter described for actuating the endless carrier of the conveyer to elevate the material dumped into the hopper or pit.

The ends of the casing are provided with suitable openings 19 to afford access to the interior, and they are also provided with approximately V-shaped draft-irons 20, which enable a team to be readily hitched to either end of the casing for drawing the apparatus from one place to another. Instead of mounting the casing on runners, as shown in the drawings, wheels may of course be provided, if desired.

The top of the casing is provided with end openings 21, and suitable covers 22 are arranged over the openings and are adapted to be alternately removed and replaced to enable the contents of a wagon to be dumped into the hopper or pit. The apparatus is provided at the ends of the casing with suitable detachable inclines 23 to enable wagons to be readily driven upon the casing or frame, and the top of the latter is also provided with side openings 24, in which are mounted dumping platforms or beams 25, adapted to receive the wheels of a wagon and to be tilted in either direction to arrange the body of the wagon in an inclined position for causing the contents of the same to be discharged into the hopper or pit through one of the end openings 21. The covers 22 are supported upon suitable ledges 26, preferably formed by cleats or bars arranged transversely on the lower face of the top of the frame or casing and extending beyond the side edges or walls of the end openings, as clearly illustrated in Fig. 2 of the accompanying drawings. The dumping platforms or beams 25 are mounted on a suitable rock-shaft 27 and are supported by suitable braces 28, located beneath the dumping platforms or beams and extending longitudinally thereof and forming trusses, as clearly shown in Fig. 5. The rock-shaft preferably consists of a heavy beam rounded at the top between and beyond the dumping platforms or beams and provided at its ends with suitable journals arranged in the bearing-openings of the frame or casing. One end of the rock-shaft is provided with an upwardly-extending arm 29, shaped into a handle and arranged between suitable catches 30, forming inner shoulders and adapted to lock the arm against movement in either direction. The arm of the rock-shaft is adapted to be disengaged from either of the catches to permit it to be oscillated in either direction for tilting the dumping platform or beams for the purpose before described.

When the empty wagon is driven off the frame or casing, it is connected with one of a pair of ropes or cables 31, connected with a pair of drums 32 of the transverse shafts 18 and adapted to be alternately unwound therefrom and wound thereon to enable the said empty wagon to actuate the endless carrier and simultaneously rewind the other cable or rope on its drum to arrange the same for the next operation. The next wagon is driven on the apparatus from the opposite end, so that the team will be faced in the proper direction for unwinding the rope or cable which has been previously wound up. The ropes or cables pass outward over suitable guide-pulleys 33, indicated at the top of the frame or casing, as clearly illustrated in Fig. 2 of the accompanying drawings. The inclines are provided at their upper ends with suitable openings for the ropes or cables, which may be provided with any suitable means for enabling them to be attached to wagons or other vehicles. Also suitable guide-pulleys may be provided at the bottoms of the inclines for changing the direction of the ropes or cables to enable the wagons to be driven from the apparatus in any convenient direction. The operating-arm of the rock-shaft of the dumping apparatus is located at one side of the frame or casing, and the catches are mounted on a suitable support 34.

The transverse shafts 18, which rotate simultaneously, may be connected together by any suitable means; but an intermediate flexible connection 35 is preferably employed. The intermediate flexible connection 35, which may be formed integral with or constitute a portion of the ropes or cables 31, extends from one of the drums 32 to the other and is adapted to be alternately wound around and unwound from the said drums. When the right-hand rope or cable 31 of Fig. 2 is drawn outward, the flexible connection is wound up on the drum 32, to which the right-hand rope or cable 31 is connected, and is unwound from the other drum, which operation rewinds the left-hand rope or cable on the left-hand drum. The next wagon on leaving the apparatus will unwind the left-hand rope or cable and reverse the operation, thereby rewinding the right-hand rope or cable.

The endless carrier is continuously rotated in the same direction for the purpose of elevating the material to the chute 10, and when one of the gear-wheels 17 is in mesh with the adjacent gear-wheel the other gear-wheel 17 is thrown out of mesh with its companion gear-wheel 16. Each of the gear-wheels 17 is slidingly mounted on its shaft 18 and is connected with a suitable spring-actuated shifting-lever 36, fulcrumed between its end and having its inner end forked and straddling a suitable collar or flange of an extension of the hub of the gear-wheel 17. The shifting-levers are operated by hand, and the gearing is readily adjusted to produce a continuous forward rotation of the lower shaft 15 of the endless carrier. Instead of employing a pair of shifting-levers arranged as illustrated in the accompanying drawings any other suitable means may be employed for sliding the gear-wheels 17 into and out of mesh with the gear-wheels 16.

When it is desired to move the apparatus from one corn-crib to another or to any other place for depositing the grain, the conveyer is detached and the inclines are removed and a team may be coupled to either end of the frame or casing by means of the V-shaped draft irons or clevices 20.

It will be seen that the apparatus is exceedingly simple and inexpensive in construction, that it is adapted to be readily hauled from one place to another, and that it is capable of dumping a wagon and of elevating the contents for delivering the same to a crib or other repository. It will also be apparent that after the contents of a wagon have been discharged the empty vehicle furnishes the power for elevating the material. It will also be apparent that when the empty wagon leaves the apparatus in one direction and is attached to the adjacent cable or rope the cable or rope at the other end of the apparatus will be automatically wound up, and that the apparatus will always be in proper condition for operation.

What I claim is—

1. An apparatus of the class described comprising a frame or casing having a hopper and provided with opposite openings, the covers arranged over the openings and adapted to be alternately removed, a conveyer, gearing for operating the conveyer, and operating mechanism located at the ends of a frame or casing and adapted to be connected with an empty wagon, substantially as and for the purpose described.

2. An apparatus of the class described comprising a frame or casing having a hopper, a conveyer extending from the hopper, gearing connected with the conveyer and provided with drums located at opposite sides of the hopper, and cables or ropes extending from the apparatus in opposite directions connected with and adapted to be alternately wound around and unwound from the drums and adapted to be connected with an empty wagon when the same is leaving the apparatus, substantially as and for the purpose described.

3. An apparatus of the class described comprising a casing or frame having a hopper, shafts mounted on the frame or casing and located at opposite sides of the hopper, a conveyer, gearing connecting the conveyer with the said shafts, and flexible connections extending from the apparatus in opposite directions and adapted to be alternately wound up by the said shafts and designed to be connected with a wagon when the same is leaving the apparatus, substantially as described.

4. An apparatus of the class described comprising a frame or casing having a hopper and provided at its top with end and side openings, removable covers arranged over the end openings, the dumping platforms or beams arranged at the side openings, a rock-shaft connected with the dumping platforms or beams, a support provided with catches, an arm extending from the rock-shaft and engaged by the catches, an endless conveyer, gearing arranged at opposite sides of the conveyer, and operating mechanism located at the ends of the apparatus, and designed to be connected with the empty wagons, and capable of actuating the gearing, substantially as described.

5. An apparatus of the class described comprising a casing having a hopper and provided with a side opening, a supporting-bar arranged above the opening, a removable conveyer provided with a bar interlocked with the said supporting-bar, and gearing for operating the conveyer, substantially as described.

6. An apparatus of the class described comprising a frame or casing, a conveyer, gear-wheels arranged at opposite sides of the conveyer, shafts provided with gears arranged to mesh with the gear-wheels of the conveyer, means for moving such gearing into and out of mesh, ropes or cables connected with the shafts and adapted to be alternately wound up by the same, and means for connecting the shafts for causing the same to rotate simultaneously, substantially as described.

7. An apparatus of the class described comprising a frame or casing, a conveyer, shafts, gearing for connecting the shafts with the conveyer, means for throwing such gearing into and out of mesh to connect the conveyer alternately with the said shafts, flexible connections extending from and adapted to be wound up by the said shafts and capable of rotating the latter, and a flexible connection extending between the shafts and arranged to be wound up and unwound by the same and capable of causing the shafts to rotate simultaneously, substantially as described.

8. An apparatus of the class described comprising a frame or casing, a conveyer provided with opposite gear-wheels 16, shafts, movable gear-wheels mounted on the shafts, shifting-levers connected with the movable gear-wheels and adapted to carry the same into and out of mesh with the gear-wheels 16, flexible connections extending from the shafts and adapted to be wound up by the same, and means for connecting the shafts to cause the same to rotate simultaneously, substantially as described.

In testimony that I claim the foregoing as my own I have hereto affixed my signature in the presence of two witnesses.

PAUL E. ERICKSON.

Witnesses:
J. J. SMITH,
H. S. COOPER.